(12) United States Patent
Fischer (10) Patent No.: US 8,433,346 B2
(45) Date of Patent: Apr. 30, 2013

(54) METHOD OF PROCESSING CONTROL INFORMATION MESSAGES FOR POINT-TO-MULTIPOINT SERVICES

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 1089 days.

(21) Appl. No.: 11/466,363

(22) Filed: Aug. 22, 2006

(65) Prior Publication Data

US 2007/0042794 A1 Feb. 22, 2007

Related U.S. Application Data

(60) Provisional application No. 60/710,536, filed on Aug. 22, 2005.

(51) Int. Cl.
*H04W 4/00* (2009.01)
(52) U.S. Cl.
USPC ............. 455/466; 455/515; 455/458; 455/68; 370/312

(58) Field of Classification Search .................. None
See application file for complete search history.

(56) References Cited

U.S. PATENT DOCUMENTS

| | | | |
|---|---|---|---|
| 2004/0103435 A1 | 5/2004 | Yi et al. | |
| 2004/0202140 A1 | 10/2004 | Kim et al. | |
| 2005/0020260 A1 | 1/2005 | Jeong et al. | |
| 2005/0090278 A1 | 4/2005 | Jeong et al. | |
| 2005/0096017 A1 | 5/2005 | Kim | |
| 2005/0111395 A1 | 5/2005 | Hwang et al. | |
| 2005/0118992 A1 | 6/2005 | Jeong et al. | |
| 2005/0195852 A1* | 9/2005 | Vayanos et al. ............... 370/437 |
| 2005/0249141 A1 | 11/2005 | Lee et al. | |
| 2006/0030342 A1* | 2/2006 | Hwang et al. .................. 455/466 |
| 2006/0040655 A1* | 2/2006 | Kim ........................... 455/426.1 |
| 2010/0165901 A1* | 7/2010 | Kim ............................... 370/312 |

FOREIGN PATENT DOCUMENTS

| | | |
|---|---|---|
| EP | 1478203 | 11/2004 |
| JP | 2004-159334 | 6/2004 |
| JP | 2005124179 | 5/2005 |
| JP | 2005223718 | 8/2005 |
| RU | 2236757 | 9/2004 |
| TW | 200515723 | 5/2005 |
| TW | 200524440 | 7/2005 |
| WO | 2004-017541 | 2/2004 |
| WO | 2005-006596 | 1/2005 |

OTHER PUBLICATIONS

3GPP TS 25.346—Introduction of the Multimedia Broadcast Multicast Service (MBMS) in the Radio Access Network (RAN); Stage 2 (Release 6), Jun. 2005. See p. 14-19, Section 5.2MBMS Uu Principles.

(Continued)

*Primary Examiner* — Willie J Daniel, Jr.
(74) *Attorney, Agent, or Firm* — Lee, Hong, Degerman, Kang & Waimey (57) ABSTRACT

A method of scheduling messages based upon whether there are any changes in the content of each message to be scheduled, and also considering certain information that may be needed by the terminal. Messages are scheduled such that the terminal (UE) would only need to perform minimal reading operations, thus resulting in more efficient reception of services by the terminal based upon improved scheduling performed by the network.

16 Claims, 6 Drawing Sheets

OTHER PUBLICATIONS

3rd Generation Partnership Project (3GPP), "Universal Mobile Telecommunications System (UMTS); Radio Resource Control (RRC) Protocol Specification (3GPP TS 25.331 version 6.6.0 Release 6)," ETSI TS 125 331, Jun. 2005, XP-014030569.

LG Electronics, "MBMS Message Order on MCCH," 3GPP TSG-RAN Working Group 2 Meeting #48, Tdoc R2-052259, Sep. 2005, XP-050129322.

* cited by examiner

MCCH

METHOD OF PROCESSING CONTROL INFORMATION MESSAGES FOR POINT-TO-MULTIPOINT SERVICES

CROSS REFERENCE TO RELATED APPLICATION

Pursuant to 35 U.S.C. §119, this application claims the benefit of earlier filing date and right of priority to U.S. Provisional Application No. 60/710,536, filed Aug. 22, 2005, the contents of which are hereby incorporated by reference herein in its entirety.

FIELD OF THE INVENTION

The present invention relates to wireless (radio) communications, and in particular, relates to a method of processing control information messages for point-to-multipoint services.

BACKGROUND ART

The universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

Figure 1:
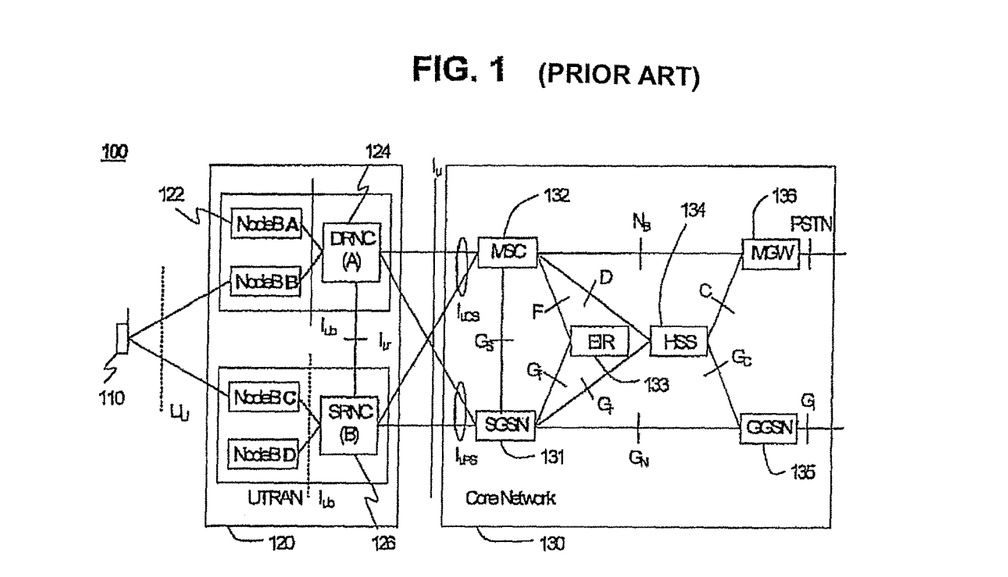
FIG. 1 shows an overview of the UMTS network.

FIG. 1 shows an overview of the UMTS network 100, including the terminal or user equipment (UE) 110, the UTRAN 120 and the core network (CN) 130.

The UTRAN 120 is composed of several Radio Network Controllers (RNCs) 124, 126 and Node Bs 122, which are connected via the Iub interface. Each RNC may control several Node Bs. Each Node B may control one or several cells, where a cell is characterised by the fact that it covers a given geographical area on a given frequency. Each RNC is connected via the Iu interface to the CN, i.e. towards the MSC (Mobile-services Switching Center) entity 132 of the CN and the SGSN (Serving GPRS Support Node) entity 131. The RNCs can be connected to other RNCs via the Iur interface. The RNC handles the assignment and management of radio resources and operates as an access point with respect to the core network.

The Node Bs receive information sent by the physical layer of the terminal (UE) through an uplink and transmit data to the terminal through a downlink. The Node Bs operate as access points of the UTRAN for the terminal. The SGSN is connected via the Gf interface to the EIR (Equipment Identity Register) 133, via the Gs interface to the MSC 132, via the Gn interface to the GGSN (Gateway GPRS Support Node) 135 and via the Gr interface to the HSS (Home Subscriber Server) 134. The EIR hosts lists of terminals (UEs) which are allowed or are not allowed to be used on the network. The MSC 132 which controls the connection for CS (circuit switched) services is connected via the NB interface towards the MGW (Media Gateway) 1361 via the F interface towards the EIR 133, and via the D interface towards the HSS 134. The MGW 136 is connected via the C interface towards the HSS 134, and to the PSTN (Public Switched Telephone Network), and allows adapting of the codecs between the PSTN and the connected RAN.

The GGSN 135 is connected via the Gc interface to the HSS 134, and via the Gi interface to the Internet. The GGSN 135 is responsible for routing, charging and separation of data flows into different RABs (Radio Access Bearers). The HSS 134 handles the subscription data of the users.

Other existing connections will not be described in detail, but would be understood by those skilled in the art.

The UTRAN 120 constructs and maintains a radio access bearer (RAB) for communication between the terminal (UE) 110 and the core network (CN) 130. The core network requests end-to-end quality of service (QoS) requirements from the RAB, and the RAB supports the QoS requirements the core network has set. Accordingly, by constructing and maintaining the RAB, the UTRAN can satisfy the end-to-end QoS requirements.

The services provided to a specific terminal (UE) are roughly divided into circuit switched (CS) services and packet switched (PS) services. For example, a general voice conversation service is a circuit switched service, while a Web browsing service via an Internet connection is classified as a packet switched (PS) service.

For supporting circuit switched services, the RNCs 124, 126 are connected to the mobile switching center (MSC) 132 of the core network and the MSC 132 is connected to the gateway mobile switching center (GMSC) that manages the connection with other networks. For supporting packet switched services, the RNCs are connected to the Serving GPRS (General Packet Radio Service) Support Node (SGSN) 131 and the Gateway GPRS Support Node (GGSN) 135 of the core network. The SGSN 131 supports the packet communications with the RNCs and the GGSN 135 manages the connection with other packet switched networks, such as the Internet.

Figure 2:
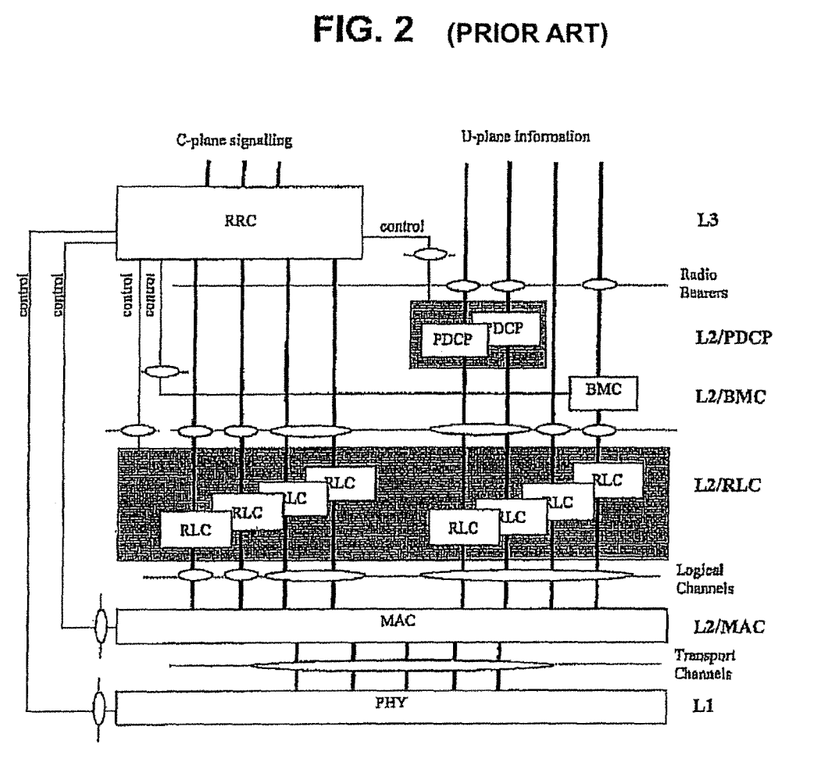
FIG. 2 illustrates a structure of a radio interface protocol between the terminal (UE) and the UTRAN according to the 3GPP radio access network standards.

FIG. 2 illustrates a structure of a radio interface protocol between the terminal (UE) and the UTRAN according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model. The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted. In general, a control channel is used to transmit information of the control plane and a traffic channel is used to transmit information of the user plane. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH) and other channels. The BCCH provides information including information utilized by a terminal to access a system. The PCCH is used by the UTRAN to access a terminal.

To support point-to-multipoint services, such as multimedia broadcast/multicast services (MBMS or MBMS services), additional traffic and control channels are introduced in the MBMS standard. For example, the MCCH (MBMS point-to-multipoint Control Channel) is used for transmission of MBMS control information, the MTCH (MBMS point-to-multipoint Traffic Channel) is used for transmitting MBMS service data, and the MSCH (MBMS Scheduling Channel) is used to transmit scheduling information.

The different types of logical channels that exist can be depicted as follows:

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (Broadcast Channel), which is a transport channel handling the broadcasting of system information. The MAC-cish sub-layer manages a common transport channel, such as a forward access channel (FACH) or a downlink shared channel (DSCH), which is shared by a plurality of terminals, or in the uplink the Random Access Channel (RACH). The MAC-m sublayer may handle the MBMS data.

Figure 3:
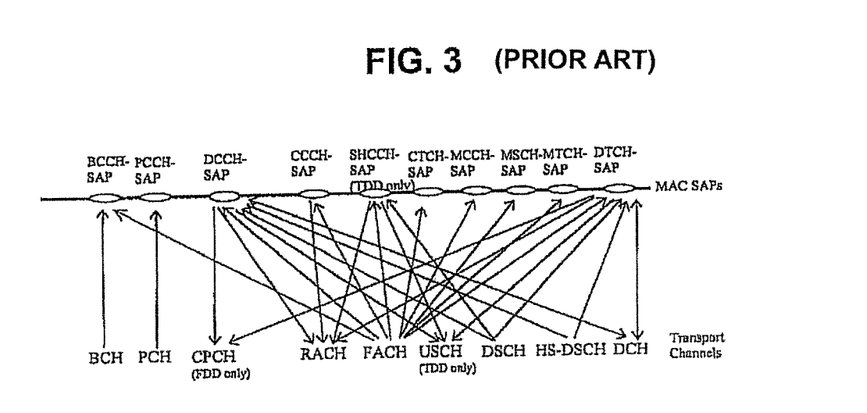
FIG. 3 shows the possible mapping between the logical channels and the transport channels from the UE perspective.

FIG. 3 shows the possible mapping between the logical channels and the transport channels from the UE perspective.

Figure 4:
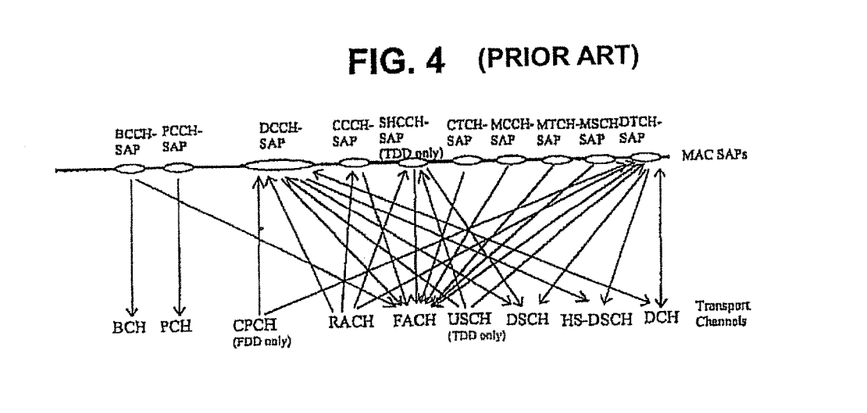
FIG. 4 shows the possible mapping between the logical channels and the transport channels from the UTRAN perspective.

FIG. 4 shows the possible mapping between the logical channels and the transport channels from the UTRAN perspective.

The MAC-d sub-layer manages a dedicated channel (DCH), which is a dedicated transport channel for a specific terminal. The MAC-d sublayer is located in a serving RNC (SRNC) that manages a corresponding terminal, and one MAC-d sublayer also exists in each terminal. The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as IPv4 or IPv6, efficiently on a radio interface with a relatively small bandwidth. For this purpose, the PDCP layer reduces unnecessary control information used in a wired network, namely, a function called header compression is performed.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally, the RRC layer handles user mobility within the RAN, and additional services, e.g., location services.

Figure 5:
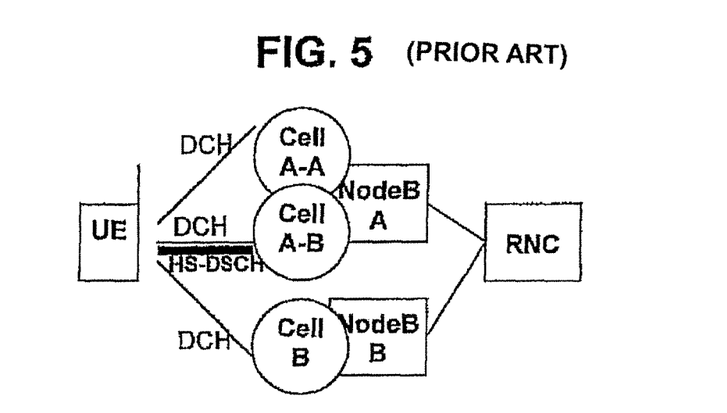
FIG. 5 shows a UE with channels (DCH, HS-DSCH) established with multiple cells managed by Node Bs, which are controlled by an RNC in a network.

FIG. 5 shows a UE with channels (DCH, HS-DSCH) established with multiple cells managed by Node Bs, which are controlled by an RNC in a network.

The different possibilities that exist for the mapping between the radio bearers and the transport channels for a given UE are not all possible all the time. The UE/UTRAN can deduce the possible mapping depending on the UE state and the procedure that the UE/UTRAN is executing. The different states and modes are explained in more detail below, as far as they concern the present invention.

The different transport channels are mapped onto different physical channels. The configuration of the physical channels is given by RRC signalling exchanged between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network to be within a region that is larger than a cell, for example a location or a routing area. Therefore, the existence of idle mode terminals is determined within large regions, and in order to receive mobile communication services such as voice or data, the idle mode terminal must move or change into the RRC connected mode.

Figure 6:
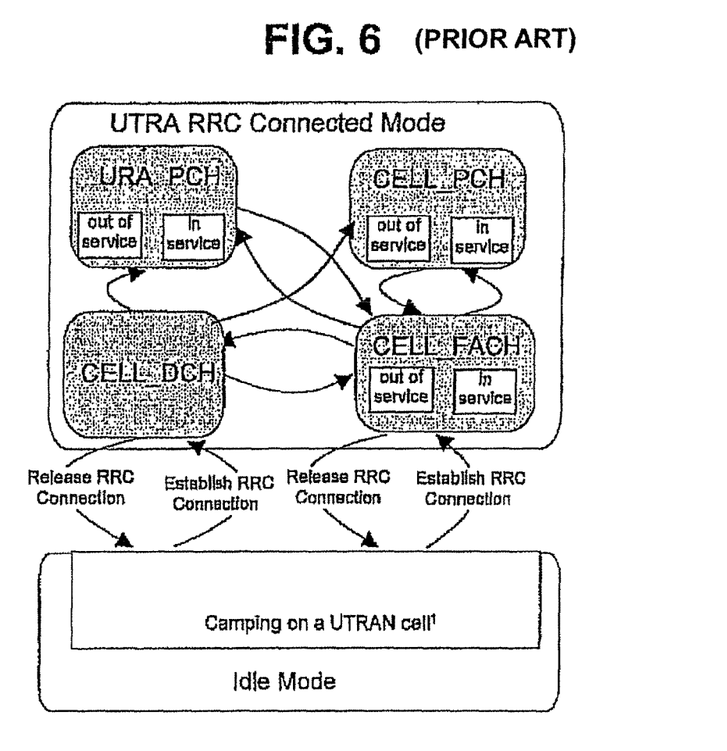
FIG. 6 shows the possible transitions between modes and states of a UE.

FIG. 6 shows the possible transitions between modes and states of a UE. A UE in RRC connected mode can be in different states, e.g. CELL_FACH state, CELL_PCH state, CELL_DCH state or URA_PCH state. Other states could exist as well. Depending on these states, the UE carries out different actions and listens to different channels. For example, a UE in CELL_DCH state will try to listen to DCH type transport channels (amongst other channels), which may comprise DTCH and DCCH transport channels, and which can be mapped to a certain DPCH, DPDSCH, or other physical channels. The UE in CELL_FACH state will listen to several FACH transport channels, which are mapped to a certain S-CCPCH. The UE in PCH state will listen to the PICH channel, and to the PCH channel that is mapped to a certain S-CCPCH physical channel.

The network (UTRAN) may provide various types of services to a terminal (UE). One example would be multimedia broadcast/multicast service, also referred to as MBMS or MBMS service.

At the start of a service, the UE is supposed to read different messages depending on the situation. For example, the UE should acquire counting, establish RRC connections, receive a MTCH, and the like.

In order to send and receive these messages, a particular order (sequence or arrangement) is used such that messages for which the content has changed is sent/received before messages for which the content has not changed.

MBMS signalling on the MCCH makes use of identifiers to allow reference information to be carried in one message (message A) and which is referred to in another message (message B). These identifiers are valid only for messages that have been read in the same modification period.

In the related art, the messages are ordered merely based upon whether or not their content has changed. Namely, messages containing changed contents are transmitted before messages containing no changed contents. However, this simple condition may not always be optimal.

SUMMARY

A method of scheduling messages (e.g., service information, cell configuration data, control information messages, etc.) is provided such that the terminal (UE) only needs to read a minimum number of messages that are sent from the network. In addition to whether there are any changes in the content of each message to be scheduled (then transmitted and later received), certain information that may be needed by the terminal is also considered. Based upon these criteria, the messages are scheduled such that the terminal (UE) would only need to perform minimal reading operations, thus resulting in more efficient reception of services by the terminal based upon improved scheduling performed by the network.

DESCRIPTION

One aspect of the present invention is the recognition by the present inventors regarding the problems and drawbacks of the related art described above and explained in more detail hereafter. Based upon such recognition, the features of the present invention have been developed.

Unlike the related art, a better determination for ordering or scheduling messages should depend upon multiple factors, such as the particulars of the terminal (UE) (e.g., moving to a new cell, changes in signaling conditions, etc.), the type of service to be received by the terminal (UE), and the like. Namely, the terminal (UE) may need to receive (or read) certain control channels at particular times due to changes in the communications environment. Thus, a more sophisticated scheme for scheduling control information messages is necessary.

Although the following description will refer to point-to-multipoint services (e.g., an MBMS service) merely for the sake of explanation, the features of the present invention are clearly intended to be applicable to various other types of data transmission and/or reception procedures that would benefit from employing the particular scheduling or ordering of information (or data) according to the present invention.

To illustrate the features of the present invention, MBMS specific procedures will be described. In particular, the reception of MBMS control information will be considered.

In general, the procedure for receiving MBMS control information is used by a UE to receive information from UTRAN concerning the way it provides MBMS services the UE has joined. The procedure applies to all UEs supporting MBMS, irrespective of its state (idle, URA_PCH, CELL_PCH, CELL_FACH and CELL_DCH).

Figure 7:
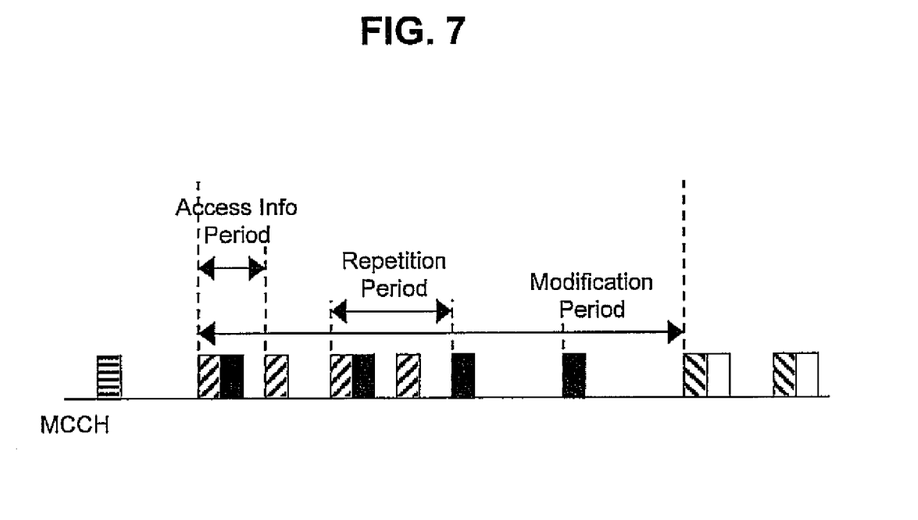
FIG. 7 shows an example of how different types of MCCH information may be scheduled.

FIG. 7 shows the general principles for scheduling of MCCH information. In FIG. 7, the different shading indicates potentially different content of the MCCH information.

Most MBMS control information is provided on the MCCH. The information on MCCH is transmitted by using a fixed schedule, which is common for all services. MCCH information other than MBMS Access Information message is transmitted periodically based on a repetition period. This MCCH information is repeated a configurable number of times with exactly the same content; the period in which the content of MCCH information other than MBMS Access Information message remains unchanged is called the modification period. MBMS Access Information message may be transmitted more frequently, based on the Access Info period.

The transmissions of MBMS Access Information message within a modification period need not have exactly the same content. Namely, the value of some parameters (e.g. IE Access probability factor—Idle) may change. Nevertheless, the transmissions of MBMS Access Information message within a modification period should concern the same MBMS service(s), although information for a service may be removed e.g., upon completion of the counting for that service, For services provided via a p-t-m radio bearer scheduling information may be provided on an MSCH mapped on the same S-CCPCH as the p-t-m radio bearer(s). For some of the services provided p-t-m this scheduling information may be provided by signalling an MBMS Scheduling Information message at every scheduling period, while for others the MBMS Scheduling Information message may be signalled less frequently i.e. after a multiple of the scheduling period. In general, the UE is neither required to acquire MSCH information nor to act on it.

In case the UE shall acquire MCCH information that is scheduled at the same time as MSCH information, the reception of the MCCH information shall take precedence.

In order to minimize the time the UE needs to read MCCH upon notification to acquire the required information, UTRAN should schedule the MCCH messages in a specific order. Namely, messages that carry information necessary for UEs that have subscribed to services included in the message MBMS MODIFIED SERVICES INFORMATION in the current modification period should be scheduled prior to the remaining messages. In other words, any message that needs to be read by any UE due to the reception of the MBMS MODIFIED SERVICES INFORMATION message should be scheduled prior to the remaining messages. More specifically, the UE may assume that the UTRAN schedules the MCCH messages in the following order (i.e., sequence, arrangement, etc.):

(1) MBMS MODIFIED SERVICES INFORMATION, (2) followed by messages that carry information necessary for UEs that have subscribed to services included in the message MBMS MODIFIED SERVICES INFORMATION in the current modification period (i.e., followed by messages that need to be read by any UE due to the content of the MBMS MODIFIED SERVICES INFORMATION message)—in the following order: MBMS General Information, MBMS Common P-T-M RB Information, MBMS Current Cell P-T-M RB Information, one or more MBMS Neighbouring Cell P-T-M RB Information, (3) MBMS UNMODIFIED SERVICES INFORMATION, (4) followed by messages that carry information that is not necessary for UEs that have subscribed to services included in the message MBMS MODIFIED SERVICES INFORMATION in the current modification period (i.e., followed by messages that do not need to be read by any UE due to the content of the MBMS MODIFIED SERVICES INFORMATION message)—in the following order: MBMS General Information, MBMS Common P-T-M RB Information, MBMS Current Cell P-T-M RB Information, one or more MBMS Neighbouring Cell P-T-M RB Information.

Figure 8:
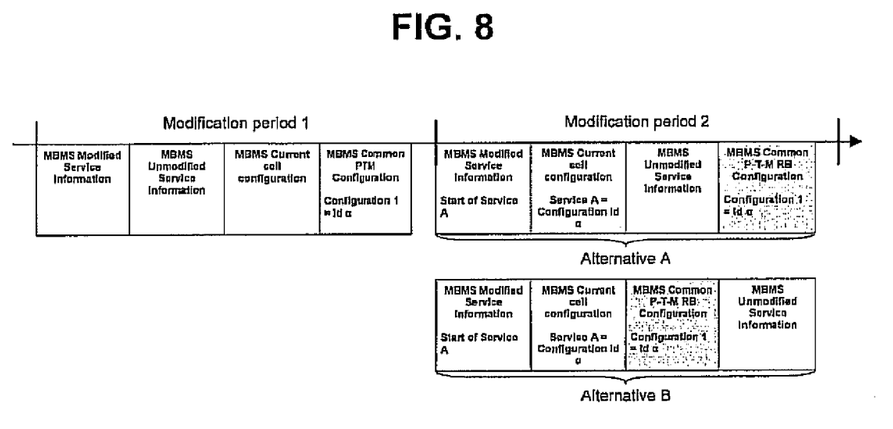
FIG. 8 shows an example of the scheduling of MCCH information at MTCH transmission start.

FIG. 8 shows an example of the scheduling of MCCH information at MTCH transmission start.

It is assumed that at session start, no service is active in Modification Period 1. The Common p-t-m configuration α is already transmitted. In the Modification Period 2, the start of the new service A and the transmission on MTCH in the current cell is indicated.

Therefore, it seems clear that the MBMS Current Cell Configuration should be transmitted before the MBMS Unmodified Service information since all UEs interested in the new/modified service A need to read it. However, there is some ambiguity versus the MBMS Common P-T-M Configuration message. The content in this example has not changed which suggests to consider it as being not changed, and thus schedule it behind the MBMS Unmodified Service Information message as shown in Alternative A in FIG. 8. However, this must be read by the UEs that want to read the Service A. Therefore, it would be beneficial for the UE reading to schedule the MBMS Common P-T-M Configuration message before the MBMS Unmodified Service Information message.

Figure 9:
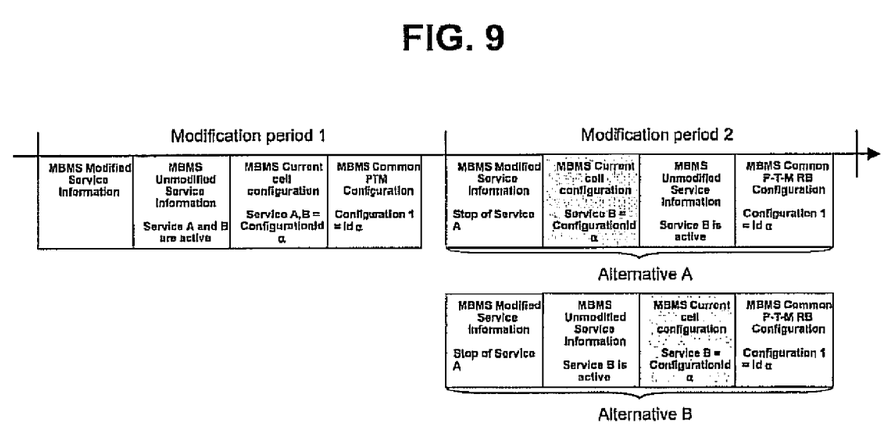
FIG. 9 shows an example of the scheduling of MCCH Information at session stop.

FIG. 9 shows an example of the scheduling of MCCH Information at session stop. In FIG. 9, the session stop of active services transmitted on a MTCH configuration is shown. In Modification period 1 the services A and B are active and mapped to the MTCHs. In the second modification period the service A stops. Therefore in the modification period 2 the MBMS Current Cell Configuration message content will be changed, and according to the prior art the message would be sent before the MBMS Unmodified Service Information message, as described in FIG. 9, alternative A. However there is no need that UEs read that message. It is therefore natural that the message would be scheduled as non-modified as shown in FIG. 9, alternative B.

As general rule, messages that are supposed to be read by UEs that want to receive services listed in the MBMS Modified Service Information should be included before the MBMS Unmodified Service Information message, and the messages that don't contain information necessary for receiving services listed in the MBMS Modified Service Information should be included after the message MBMS Unmodified Service Information contrary to the related art rule that only considers whether the content of the message has changed or not.

Therefore, the present invention proposes to clarify the ordering of messages on the MCCH according to the above, i.e. only transmit messages that need to be read by UEs interested in services listed in the MBMS Modified Service Information message before the MBMS Unmodified Service Information message.

The present invention provides a method of processing control information messages, the method comprising: transmitting a modified services information (MSI) message; transmitting, if necessary after transmitting the MSI message, a first set of messages that is used by any terminal based on the modified services information message; and transmitting an unmodified services information (USI) message after transmitting the MSI message or after transmitting the first set of messages.

Here, the method further comprises: transmitting, if necessary after transmitting the USI message, a second set of messages that is not used by any terminal based on the MSI message. The messages provide control information for a point-to-multipoint service. The messages relate to MCCH information. The first set of messages are messages that need to be read by any terminal due to the content of the MSI message. The second set of messages are messages that do not need to be read by any terminal due to the content of the MSI message.

Also, the present invention provides a method of processing control information messages, the method comprising: determining a first set of messages if at least one such message that needs to be read by any terminal based on a modified services information (MSI) message exists; and determining a second set of messages if at least one such message that does not need to be read by any terminal based on the MSI message exists.

The method further comprises: transmitting the MSI message; transmitting the first set of messages if determined to exist; transmitting an unmodified services information (USI) message; and transmitting the second set of messages if determined to exist.

Additionally, the present invention provides a method of processing control information messages by a terminal, the method comprising: receiving a modified services information (MSI) message; receiving, if necessary after receiving the MSI message, a first set of messages that is used by any terminal based on the modified services information message; and receiving an unmodified services information (USI) message after receiving the MSI message or after receiving the first set of messages.

The method further comprises: receiving, if necessary after receiving the USI message, a second set of messages that is not used by any terminal based on the modified services information message.

The method wherein terminal has successfully received a MCCH during a previous modification period. The method wherein the terminal stops reading at an appropriate received message without having to read all received messages.

Furthermore, the present invention provides a message sequence format for control information messages of a point-to-multipoint service, the format comprising: a modified services information (MSI) message; a first set of messages, immediately following the MSI message, that need to be read by any terminal due to the content of the MSI message; and an unmodified services information (USI) message immediately following the first set of messages.

The format further comprises: a second set of messages, immediately following the USI message, that does not need to be read by any terminal due to the content of the MSI message.

Also, the present invention comprises: a message sequence format for control information messages of a point-to-multipoint service, the format comprising: a modified services information (MSI) message; an unmodified services information (USI) message following the MSI message; and a second set of messages, immediately following the USI message, that does not need to be read by any terminal due to the content of the modified services information message.

The format further comprises: a first set of messages, immediately following the MSI message but immediately before the USI message, that need to be read by any terminal due to the content of the modified services information message.

The present invention provides a message sequence format for control information messages of a point-to-multipoint service, the format comprising: a first message for modified contents; a subsequent message for unmodified contents; and any optional messages, between the first message and the subsequent message, that need to be read by any terminal due to the content of the first message.

The format further comprises: any optional messages, after the subsequent message, that need not be read by any terminal due to the content of the first message.

The message sequence format wherein four sequential messages exist for a modification period, comprising: a first message containing modified services information, a second message containing current cell configuration information, a third message containing common point-to-multipoint radio bearer configuration information, and a fourth message containing unmodified services information.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of processing control information messages, the method comprising:
   transmitting a modified services information (MSI) message;
   transmitting, if necessary after transmitting the MSI message, a first set of messages that is used by at least one terminal based on the MSI message;
   transmitting an unmodified services information (USI) message after transmitting the MSI message or after transmitting the first set of messages; and
   transmitting, if necessary after transmitting the USI message, a second set of messages that is not used by the at least one terminal based on the MSI message,
   wherein the first set of messages needs to be read by the at least one terminal due to the content of the MSI message and sequentially comprises a Multimedia Broadcast/Multicast Service (MBMS) General Information message, an MBMS Common Point-to-Multipoint (P-T-M) Radio Bearer (RB) Information message, an MBMS Current Cell P-T-M RB Information message, and one or more MBMS Neighboring Cell P-T-M RB Information messages,
   wherein the second set of messages does not need to be read by the at least one terminal due to the content of the MSI message and sequentially comprises a Multimedia Broadcast/Multicast Service (MBMS) General Information message, an MBMS Common Point-to-Multipoint (P-T-M) Radio Bearer (RB) Information message, an MBMS Current Cell P-T-M RB Information message, and one or more MBMS Neighboring Cell P-T-M RB Information messages.

2. The method of claim 1, wherein the MSI message, the USI message, the first set of messages, and the second set of messages provide control information for a point-to-multipoint service.

3. The method of claim 2, wherein the MSI message, the USI message, the first set of messages, and the second set of messages are related to MBMS point-to-multipoint Control Channel (MCCH) information.

4. A method of processing control information messages, the method comprising:
   determining a first set of messages if at least one message exists that needs to be read by at least one terminal based on a modified services information (MSI) message;
   determining a second set of messages if at least one message exists that does not need to be read by the at least one terminal based on the MSI message; and
   transmitting the MSI message;
   transmitting the first set of messages if determined to exist;
   transmitting an unmodified services information (USI) message; and
   transmitting the second set of messages if determined to exist,
   wherein the first or second set of messages sequentially comprises a Multimedia Broadcast/Multicast Service (MBMS) General Information message, an MBMS Common Point-to-Multipoint (P-T-M) Radio Bearer (RB) Information message, an MBMS Current Cell P-T-M RB Information message, and one or more MBMS Neighboring Cell P-T-M RB Information messages.

5. A method of processing control information messages by at least one terminal, the method comprising:
receiving a modified services information (MSI) message;
receiving, if necessary after receiving the MSI message, a first set of messages that is used by the at least one terminal based on the MSI message;
receiving an unmodified services information (USI) message after receiving the MSI message or after receiving the first set of messages; and
receiving, if necessary after receiving the USI message, a second set of messages that is not used by the at least one terminal based on the MSI message,
wherein the first or second set of messages sequentially comprises a Multimedia Broadcast/Multicast Service (MBMS) General Information message, an MBMS Common Point-to-Multipoint (P-T-M) Radio Bearer (RB) Information message, an MBMS Current Cell P-T-M RB Information message, and one or more MBMS Neighboring Cell P-T-M RB Information messages,
wherein the at least one terminal has successfully received an MBMS point-to-multipoint Control Channel (MCCH) during a previous modification period, and
wherein the at least one terminal stops reading at an appropriate received message without having to read all received messages.

6. A network comprising: a transmitter configured to transmit Multimedia Broadcast/Multicast Service (MBMS) control information messages of a point-to-multipoint service from a mobile terminal, wherein the MBMS control information messages comprise a first message for modified contents, a second subsequent message for unmodified contents, optional messages between the first message and the second subsequent message that need to be read by at least one terminal due to the content of the first message, and optional messages after the second subsequent message that need not be read by the at least one terminal due to the content of the first message, wherein the MBMS control information messages are four sequential messages that exist for a modification period, the four sequential messages comprising: the first message comprising modified services information, a first optional message comprising current cell configuration information or a second optional message comprising common point-to-multipoint radio bearer configuration information, the second subsequent message comprising unmodified services information, and a third optional message comprising current cell configuration information or a fourth optional message comprising common point-to-multipoint radio bearer information.

7. A mobile terminal comprising: a receiver configured to receive Multimedia Broadcast/Multicast Service (MBMS) control information messages of a point-to-multipoint service from a network, wherein the MBMS control information messages comprise a first message for modified contents, a second subsequent message for unmodified contents, optional messages between the first message and the second subsequent message that need to be read by any terminal due to the content of the first message, and optional messages after the second subsequent message that need not be read by at least one terminal due to the content of the first message, and wherein the MBMS control information messages are four sequential messages that exist for a modification period, the four sequential messages comprising: the first message comprising modified services information, a first optional message comprising current cell configuration information or a second optional message comprising common point-to-multipoint radio bearer configuration information, the second subsequent message comprising unmodified services information, and a third optional message comprising current cell configuration information or a fourth optional message comprising common point-to-multipoint radio bearer information.

8. A method of processing Multimedia Broadcast/Multicast Service (MBMS) control information messages for user equipments (UEs) that have subscribed to MBMS services, the method comprising: transmitting a modified MBMS services information (MSI) message; transmitting an unmodified MBMS services information (USI) message after transmitting the MSI message; transmitting at least one of a first set of messages and a second set of messages; and transmitting, after transmitting the USI message, the second set of messages that carry information not necessary for UEs that have subscribed to services included in the MSI message, wherein the first set of messages follow the MSI message and need to be read by the UEs based on the MSI message, wherein the second set of messages follow the USI message and do not need to be read by the UEs based on the MSI message, and wherein the first or second set of messages sequentially comprises an MBMS general information message, an MBMS common point-to-multipoint (P-T-M) radio bearer (RB) information message, an MBMS current cell P-T-M RB information message, and one or more MBMS neighboring cell P-T-M RB information messages.

9. The method of claim 8, wherein the first and second set of messages provide control information for a point-to-multipoint service.

10. The method of claim 9, wherein the first and second set of messages relate to MBMS Control Channel (MCCH) information.

11. The method of claim 8, wherein the first set of messages are messages that need to be read by the UEs due to the content of the MSI message.

12. The method of claim 8, wherein the second set of messages are messages that do not need to be read by the UEs due to the content of the MSI message.

13. A method of processing Multimedia Broadcast/Multicast Service (MBMS) control information messages by a user equipment (UE) that has subscribed to MBMS services, the method comprising: receiving a modified MBMS services information (MSI) message; receiving an unmodified MBMS services information (USI) message after receiving the MSI message; receiving at least one of a first set of messages and a second set of messages; and receiving, after receiving the USI message, the second set of messages that carry information not necessary for a UE that has subscribed to services included in the MSI message, wherein the first set of messages follow the MSI message and need to be read by the UE based on the MSI message, wherein the second set of messages follow the USI message and do not need to be read by the UE based on the MSI message, and wherein the first or second set of messages sequentially comprises an MBMS general information message, an MBMS common point-to-multipoint (P-T-M) radio bearer (RB) information message, an MBMS current cell P-T-M RB information message, and one or more MBMS neighboring cell P-T-M RB information messages.

14. The method of claim 13, wherein the UE has successfully received an MBMS Control Channel (MCCH) during a previous modification period.

15. The method of claim 13, wherein the first set of messages are messages that need to be read by the UE due to the content of the MSI message.

16. The method of claim 13, wherein the second set of messages are messages that do not need to be read by the UE due to the content of the MSI message.

* * * * *